United States Patent

Ehlers

[11] 3,899,316
[45] Aug. 12, 1975

[54] BENDING OF GLASS SHEETS
[75] Inventor: Robert Ehlers, Redditch, England
[73] Assignee: Triplex Safety Glass Company Limited, London, England
[22] Filed: Mar. 12, 1974
[21] Appl. No.: 450,375

[30] Foreign Application Priority Data
July 20, 1973 United Kingdom............... 34708/73

[52] U.S. Cl. ...................... 65/106; 65/273; 65/289; 65/374
[51] Int. Cl.² ......................................... C03B 23/02
[58] Field of Search ............ 65/106, 273, 275, 287, 65/289, 374

[56] References Cited
UNITED STATES PATENTS
3,506,430   4/1970   Oelke et al. ....................... 65/106 X
3,763,533   10/1973  Blom et al. ........................ 65/374 X Primary Examiner—Arthur D. Kellogg
Attorney, Agent, or Firm—Burns, Doane, Swecker & Mathis

[57] ABSTRACT

Hot glass sheets are bent between complementary bending surfaces which are the surfaces of resilient layers of alumino-silicate fibre mat material. For bending glass sheets for use in the manufacture of laminated windows for vehicles the continuous convex surface of a male die and the bending surface of an open frame female die of concave form are both covered with that fibre mat material.

12 Claims, 2 Drawing Figures

BENDING OF GLASS SHEETS

BACKGROUND OF THE INVENTION

1. Field of the Invention

This invention relates to the bending of glass sheets for example for the manufacture of windscreens and windows for aircraft and road and rail vehicles.

In the production of bent glass sheets which are either toughened or annealed for use singly or in the production of laminates for such windows it is customary to cut a sheet of flat glass to the required shape and then to heat the glass to a temperature near to its softening point, usually suspended from tongs, by means of which the sheet is transported between a pair of bending dies which have complementary shapes and between which the glass sheet is bent to a desired curvature, for example to the desired curved shape required for the production of vehicle windscreens.

2. Description of the Prior Art

Currently in use are pairs of bending dies which include a male die of convex form having a continuous metal surface or skin which is supported from a rear frame. The other die of the pair is a female die in the form of an open frame of concave shape complementary to the convex shape of the male die, the open frame being shaped to engage the glass sheet periphery and to press the glass sheet against the continuous surface of the male die.

Such dies have been made of refractory metal for example heat resisting stainless steel. The surfaces of the male and female dies which contact the glass are accurately formed and finished but even so it has been found that marking of the faces of the glass sheet may occur due to imperfections in the surfaces of the dies in particular in the continuous surface of the male die. Also adhesion can occur between one face of the glass sheet and points on the surface of the male die which gives rise to an effect caused by localised adhesion between the hot glass surface and the bare metal surface of the die, when the male die is withdrawn from contact with the glass sheet after bending. This may result in the formation of minute pimples on the surface of the glass sheet which subsequently can act as points of stress concentration during quenching of the glass sheet in a subsequent toughening process resulting in the formation of flowlines in the face of the quenched glass sheet. Such flowlines are micro-cracks in the surface of the glass which emanate from the pimples on the glass surface, and which may be several centimeters long. This effect has been found in some circumstances to be troublesome during subsequent quenching of the bent glass sheet in a chilling liquid for example a mineral oil, to toughen the bent glass sheet.

Some sticking of the glass sheet to the male die may also occur around the periphery of the surface of the die in the region where the glass sheet is under greatest compression between the periphery of the male die and the rim of the female die and forces necessary to overcome the adhesion between the edges of the glass sheet and the periphery of the male die may cause distortion of the sheet from its exact die bent shape. Sticking of the peripheral female die to the glass may also occur which would also effect the shape of the bent glass due to the use of force to overcome the adhesion between the rim of the female die and the glass upon separation of the dies.

Under some conditions of operation, when the male and female dies are not at the same temperature as the bent glass sheet when it is presented to the dies, may result in the production of thermal gradients in the bent sheet. If the glass is hotter than the die surfaces for example the glass being at 655°C while the dies are at 625°C, the surface temperature of the glass will fall by from 15°C to 20°C as a result of the contact and the fall in temperature is greatest at the points on the glass where there is good thermal contact between the glass surface and the metal surface of the die. In other areas the glass surface remains nearer to its initial temperature due to the trapping of a thin layer of air between non-contacting surfaces of the glass sheet and the die.

Such temperature gradients as can in such circumstances be introduced into the glass may give rise to a variable stress pattern in the glass upon subsequent quenching.

It has been known to provide an asbestos or woven glass fibre covering on the die surfaces which contact the glass. Such coatings have very little resilience.

It is a main object of the present invention to overcome the problems described above and to provide a facing one or both of the dies of a material which is resilient, does not stick to the hot glass surfaces and provides a high degree of thermal insulation thereby providing a cushioning effect between the faces of the glass sheet and the accurately-shaped die surfaces.

SUMMARY

A method of bending a glass sheet according to the invention comprises heating the sheet to bending temperature and engaging opposite faces of the sheet with complementary bending surfaces at least one of which is a surface of a resilient layer of alumino-silicate fibre mat material, which may for example be in the form of paper adhering to the die.

Such material consisting of bulked alumino-silicate fibre possesses a high degree of thermal insulation and is resilient having an inherent elastic flexibility which is retained at high temperature despite repeated cyclic compression of the layer during a series of die bending operations.

The fibre material in paper form is made from the blown fibres by a normal paper forming process and may include a small amount of binder to bind the fibres. The paper is cemented to the metal surface of the die and a protective layer of hardener may be sprayed on to the paper when in position. Preferably the fibre in paper form is of thickness in the range 1 mm to 3 mm, has a thermal conductivity of from $9.63 \times 10^5$ to $11.53 \times 10^5$ calories/cm²/sec/°C over the temperature range 600°C to 700°C, and has a free volume of 85% to 95%, the free volume being the amount of free air space present in the bulk of the material between the fibres.

BRIEF DESCRIPTION OF THE DRAWINGS

An embodiment of the invention will now be described, by way of example with reference to the accompanying drawings in which.

DESCRIPTION OF THE PREFERRED EMBODIMENT

Figure 1:
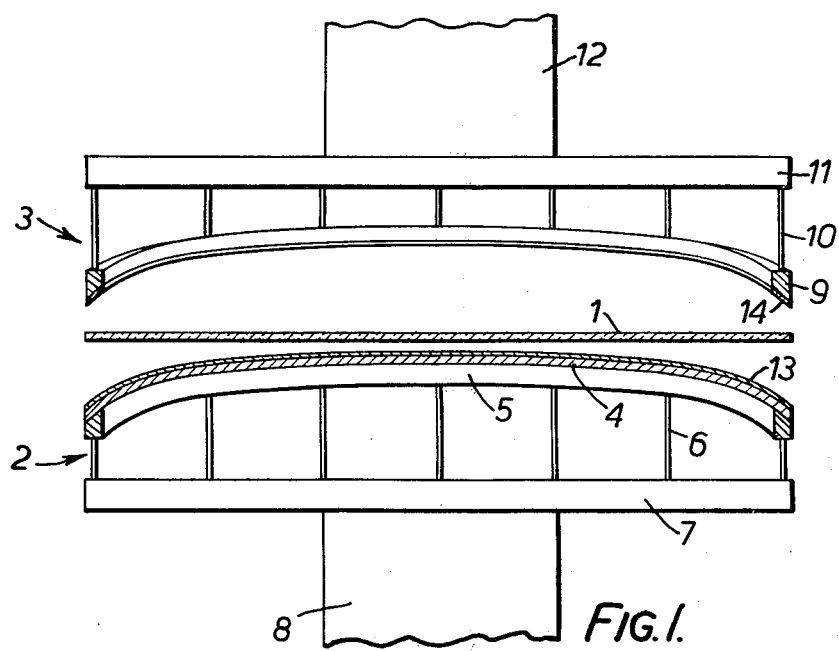
FIG. 1 shows diagrammatically and in crosssection the construction of a pair of complementary bending dies according to the invention having resilient thermally insulating coatings on their glass contacting surfaces.

Referring to the drawings a sheet of glass 1 to be bent is supported between a pair of complementary bending dies being a male die generally indicated at 2 and a female die indicated at 3. The male die has a continuous convex metal surface 4 of heat resistant stainless steel which is supported on a shaped frame 5, which frame is connected by adjustable struts 6 to a backing frame 7 fixed on a die actuating member 8. By means of the adjustable struts 6 the exact curvature of the continuous surface 4 of the male die can be accurately defined.

The female die 3 comprises an open metal frame 9 of concave form for peripherally engaging the sheet to be bent and pressing that sheet against the continuous male die surface in known manner. The open metal frame 9 is supported on adjustable struts 10 which connect the frame to a backing frame 11 which is mounted on a female die actuating member 12. The male die surface 4 has a continuous resilient facing layer 13 of alumino-silicate fibre mat material which is stuck to the convex surface of the metal die. The glass contacting surface of the female ring die 9 also has a coating of the same type of layer of alumino-silicate fibre mat material indicated at 14.

Thus the die surfaces which contact the faces of the hot glass sheet are respectively concave and convex surfaces of a resilient layer of alumino-silicate fibre mat material.

Figure 2:
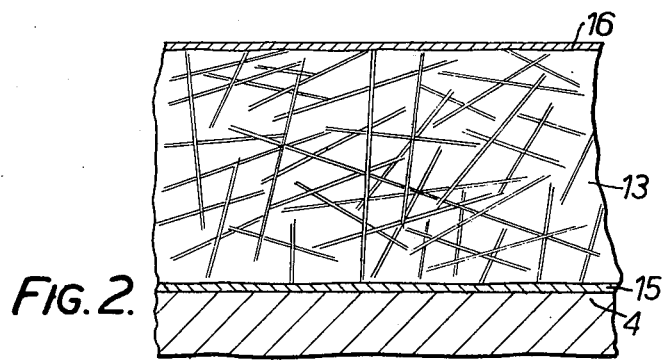
FIG. 2 is an enlarged cross-section through the insulating coating on the surface of one of the dies.

A particularly suitable material which has been tried and has proved successful in practice is an alumino-silicate fibre paper produced by Morganite Ceramic Fibres Limited and marketed under the Trade Mark "Triton Kaowool". This material is made from blown alumino-silicate fibre made by blowing high pressure compressed air into molten high purity china clay. The fibres so produced are formed into a paper from 1 mm to 3 mm thick by a normal paper making method. The ceramic fibre paper so produced is a non-oriented material having individual fibres, for example 12.5 mm long and 2.8 microns in diameter, disposed in random directions throughout its thickness as indicated in FIG. 2.

Paper of this kind 2 mm thick was adhered to the metal surfaces of the dies. Firstly the die surfaces were sand blasted to provide a roughened surface and then the metal was heated up to about 600°C to enable oxidation of the surface to take place resulting in a blue-black surface appearance of the metal. The die was then allowed to cool to room temperature and an air setting ceramic fibre cement, for example the cement supplied by Morganite Ceramic Fibre Limited under the Trade Mark "Triton Cement", was brushed onto the metal surface to form a cement layer 15, FIG. 2, which shows a cross-section through the coating on the male die. The alumino-silicate fibre paper 13 was then rolled onto the surface and the assembly was left to cure at room temperature for about 8 hours after which the paper was trimmed.

The resilient layers 13 and 14 on the die surfaces are of low thermal conductivity, the thermal conductivity of the material at usual die operating temperatures of from 600°C to 700°C being from $9.63 \times 10^{-5}$ to $11.53 \times 10^{-5}$ calories/cm$^2$/sec/°C. It was found in practice that the surface temperature of a glass sheet may only decrease by as little as 2°C when contacted by the surfaces of the fibre material even though the metal dies are at a temperature about 30°C below that of the glass surfaces. There was no adhesion problem and the resilience and flexibility of the fibre material was retained during continuous operation at the high bending temperature over a period. For example in one test a total of 46 aircraft windscreen glasses 12 mm thick were bent with no problems of marking of the surfaces of the glass or of the production of stress patterns during quenching in a mineral oil. The problems of "plucking" of the glass by the male die and of adhesion peripherally to the male and female dies were not apparent when using die surfaces of the alumino-silicate fibre material.

The small fibre diameter which averages about 3 microns and the paper making process to which the fibres are subjected result in a suitable material having a free volume of from 85% to 95% which material retains its resilience during repeated usage at die operating temperatures of 600°C and above, for example at 650°C. Compaction of the material which takes place during bending is by about 50% to half its thickness and is reversible.

In one manufacturing run for example, 3000 glass sheets were bent in a 3 week period without loss of resilience. By contrast an asbestos or woven glass fibre coating only has a compressibility of about 10% and compacts down to a hard layer having very limited compressibility after bending only a small number of glass sheets.

The invention thus provides an advantageous method of die bending of glass sheets without any detriment to the optical quality of the glass and by overcoming the problem of glass surfaces sticking to the dies, without detriment to the shape to which the glass is bent, the bent glass being readily released from the die surfaces without any distortion due to forces necessary to overcome adhesion as in the usual ways of die bending.

I claim:

1. A method of bending a glass sheet, comprising heating the sheet to a bending temperature and engaging opposite faces of the sheet with complementary bending surfaces at least one of which is a surface of resilient layer of alumino-silicate fibre mat material of non-oriented fibres disposed in random directions throughout the thickness of the layer and a binder which binds the fibres together, which mat material has the fibres so arranged that the volume of the mat includes from 85 percent to 95 percent free air space between the fibres.

2. A method according to claim 1, in which one face of the sheet is engaged by a continuous convex surface of said fibre material, and the other face is engaged by a concave peripheral surface of said fibre material.

3. A bending die for use in die bending a hot glass sheet, comprising a metal die shaped to the desired configuration of the sheet and on said die a resilient facing layer of alumino-silicate fibre mat material of non-oriented fibres disposed in random directions throughout the thickness of the layer and a binder which binds the fibres together, which mat material has the fibres so arranged that the volume of the mat includes from 85 percent to 95 percent free air space between the fibres.

4. A bending die according to claim 3, having a continuous convex surface which is covered with a facing layer of said fibre material in paper form adhering to the metal die.

5. A bending die according to claim 4, wherein the fibre in paper form is of thickness in the range 1 mm to 3 mm, and has a thermal conductivity of from $9.63 \times 10^{-5}$ to $11.53 \times 10^{-5}$ calories/cm²/sec/°C. over the temperature range 600°C. to 700°C.

6. A bending die according to claim 3, comprising an open metal frame of concave form for peripherally engaging one face of a sheet to be bent, which frame has a facing layer of said fibre material in paper form adhering to the metal frame.

7. A bending die according to claim 6, wherein the fibre material in paper form is of thickness in the range 1mm to 3mm, and has a thermal conductivity of from $9.63 \times 10^{-5}$ to $11.53 \times 10^{-5}$ calories/cm²/sec/°C over the temperature range 600°C to 700°C.

8. A bending die for use in die bending a hot glass sheet, comprising a metal die shaped to the desired configuration of the sheet, and on said die a facing layer of resilient alumino-silicate fibre paper of non-oriented fibres disposed in random directions throughout the thickness of the layer and a binder which binds the fibres together, which fibre paper is of thickness in the range 1mm to 3mm and has the fibres so arranged that the volume of the fibre paper includes from 85 percent to 95 percent free air space between the fibres.

9. A bending die according to claim 8 wherein said facing layer is capable of reversible resilient compaction by about 50 percent during bending of a hot glass sheet.

10. A bending die according to claim 3 wherein said facing layer is capable of reversible resilient compaction by about 50 percent during bending of a hot glass sheet.

11. A pair of bending dies for use in die bending a hot glass sheet comprising: a male die having a continuous convex stainless steel surface shaped to the desired configuration of the sheet and a facing layer of resilient alumino-silicate fibre paper adhering to that convex stainless steel surface for engagement by one face of a sheet to be bent; a female die in the form of an open metal frame of concave form matching the shape of the male die and for peripherally engaging the other face of the sheet to be bent, which frame has a facing layer of resilient alumino-silicate fibre paper adhering to the metal frame; and wherein said facing layers are of alumino-silicate fibre paper, of thickness in the range 1mm to 3mm, of non-oriented fibres disposed in random directions throughout the thickness of the layer and a binder which binds the fibres together, the fibre paper also having a thermal conductivity of from $9.63 \times 10^{-5}$ to $11.53 \times 10^{-5}$ calories/cm²/sec°C. over a temperature range 600°C. to 700°C. and having the fibres so arranged that the volume of the fibre paper includes from 85 percent to 95 percent free air space between the fibres.

12. A pair of bending dies according to claim 11 wherein said facing layers are capable of reversible resilient compaction by about 50 percent during bending of a hot glass sheet.

\* \* \* \* \*